United States Patent [19]

Ono

[11] Patent Number: 4,796,138
[45] Date of Patent: Jan. 3, 1989

[54] SHUTTER IN A WRITE PROTECT MAGNETIC DISK CARTRIDGE

[75] Inventor: Tuyoshi Ono, Kanagawa, Japan

[73] Assignee: Fuji Photo Film Co., Ltd., Kanagawa, Japan

[21] Appl. No.: 33,695

[22] Filed: Apr. 3, 1987

[30] Foreign Application Priority Data

Apr. 4, 1986 [JP] Japan .............................. 61-49730[U]

[51] Int. Cl.⁴ ...................... G11B 23/03; G11B 19/04
[52] U.S. Cl. ........................................ 360/133; 360/60
[58] Field of Search ........................... 360/133, 132, 60

[56] References Cited

U.S. PATENT DOCUMENTS 4,360,845 11/1982 Tajima et al. ...................... 360/133
4,549,240 10/1985 Hodges ............................... 360/133
4,685,017 8/1987 Swinburne et al. .................. 360/133

FOREIGN PATENT DOCUMENTS 85983 8/1983 European Pat. Off. ............ 360/133

Primary Examiner—John H. Wolff
Assistant Examiner—Matthew J. Bussan
Attorney, Agent, or Firm—Sughrue, Mion, Zinn, Macpeak and Seas

[57] ABSTRACT

A write-protect shutter in a magnetic disk cartridge in which the two case walls are joined by a boss around which legs of the shutter slide. The fusing joining the boss to the case wall may cause a protrusion at the joint. The legs are formed with indentations to avoid the protrusion.

8 Claims, 2 Drawing Sheets

PRIOR ART

SHUTTER IN A WRITE PROTECT MAGNETIC DISK CARTRIDGE

BACKGROUND OF THE INVENTION

1. Field of the Invention

The present invention relates to a magnetic disk cartridge in which a magnetic disk sheet, (which is a magnetic recording medium of very small thickness) is rotatably housed. The invention particularly relates to a magnetic disk cartridge provided with a write-protect member for preventing the erasure of information recorded on a magnetic disk sheet.

2. Background of the Invention

A magnetic disk sheet rotatably housed in a cartridge case has a central circular hole at which a center core is secured. When the drive shaft of a write/read device, which is coupled to the center core, is rotated, the magnetic disk sheet is also rotated. In order to normally write or read magnetically-recorded information into or from the magnetic disk sheet, a writing head or a reading head is moved on the sheet in its radial direction while the sheet is being rotated.

Both a recording/reproduction device and a magnetic disk cartridge are provided with mistaken erasure prevention mechanisms to prevent already-recorded information from being erased by mistake when the cartridge is loaded in the device. These mistaken erasure prevention mechanisms are normally called write-protect mechanisms since they prevent the writing of new information to the disk.

A through hole is provided at one corner of the case of the magnetic disk cartridge to be protected. The recording/reproduction device is provided with a through hole detection means in such a position that the detection means corresponds to the through hole when the cartridge is loaded in the device. The through hole is thus detected by the through hole detection means to make it impossible to write and erase information.

Although the through hole detection means is usually made of either a pin insertable into the through hole or alternatively of a combination of a light emission element which emits light into the through hole and a light reception element which receives the light emitted into the through hole, the detection means is not confined to such structures.

In order to write or erase the information, it is required that the through hole of the case is not detected by the through hole detection means. For that purpose, the case is provided with a write-protect member by which the through hole can be appropriately opened and closed.

FIG. 7 shows a plan view of one corner of a lower half case 1 having a through hole 2. An upper half case 9 has another corresponding positioned through hole. A write-protect shutter 3 is slidably supported to open and close the through hole 2. The lower half case 1 includes a rib 4 for restricting the sliding of the write-protect shutter 3 and projections 5 for putting the shutter 3 in engaged positions respectively exposing and covering the through hole 1.

The write-protect shutter 3 includes a opaque covering portion 6 and legs 7. When the shutter 3 is in the position shown in FIG. 7, the tips of the legs 7 are engaged with the upper projections 5 so that the through hole 2 is opened. At that time, the through hole 2 is detected by a recording/reproduction device so that the device does not erase information. When the write-protect shutter 3 is slide in the direction A so that the tips of the legs 7 are engaged below the second projections 5, the through hole 2 is covered with the covering portion 6 and therefore not detected by the recording/reproduction device, so that the device can erase information.

In order to secure the lower half case 1 and the upper half case 9 to each other, as shown in FIG. 8, the top of a boss 9 provided on the lower half case is secured to the inside surface of the upper half case by ultrasonic fuse-bonding or the like. The diameter of the boss 8 is made slightly smaller than the distance between the legs 7 so that the securing area of the boss 8 and the upper half case 9 is made as large as possible.

Each leg 7 and the boss 8 are located very close to each other as shown in FIG. 8. For that reason, if a material protrusion 10 arises at the joint of the upper half case 9 and the boss 8 due to the securing thereof by the ultrasonic fuse-bonding or the like, the width of the moving passage for the leg 7 is reduced so that the leg slides in contact with the protrusion 10, thus making it impossible to smoothly slide the write-protect shutter 3. If the material protrusion 10 is extremely large, it is impossible to slide the write-protect shutter 3 to open and close the through hole 2. Therefore, the accuracy required to secure the upper half case 9 to the boss 8 needs to be of very high degree.

SUMMARY OF THE INVENTION

The present invention was made in order to solve the above-mentioned problem. Accordingly, it is an object of the present invention to provide a magnetic disk cartridge having such a construction that even if a material protrusion, or burr, arises at the fuse-bonded portion of a boss, the sliding of a write-protect shutter is not affected by the material protrusion and a through hole can be therefore surely opened and closed by the burr.

In the magnetic disk cartridge provided in accordance with the present invention, a flexible magnetic disk sheet is housed in a case, and a write-protect shutter slides in the case to open and close the through hole. The cartridge is characterized in that the write-protect shutter has position-fixing legs facing each other across a boss for bonding the case. Also, the corners of the legs near the bonded portion of the boss are provided with contact prevention means for allowing the legs to be slid without coming into contact with the bonded portion of the boss.

Since the legs of the write-protect shutter, which slide along both the sides of the boss, are previously provided with the contact prevention means for allowing the legs to be slid without coming into contact with the bonded portion of the boss, the write-protect shutter can be smoothly slid.

Each of the contact prevention means is made of an oblique cut, a notch or the like. The contact prevention means need not be provided along the total length of the leg but is only required, at least, near the portions which would contact the boss.

DETAILED DESCRIPTION OF THE PREFERRED EMBODIMENTS

Several embodiments of the present invention, which is a magnetic disk cartridge, are described with reference to the drawings attached hereto.

Figure 1:
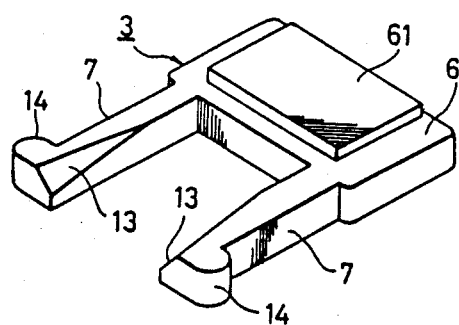
FIGS. 1, 3 and 5 show perspective views of a write-protect shutters which are embodiments of the present invention.

FIG. 1 shows a perspective view of the write-protect shutter (mistaken erasure prevention member) 3 of the magnetic disk cartridge. The shutter 3 is slidably fitted in a case to open and close a through hole 2 of a lower half case 1. The shutter 3 includes a pair of legs 7 and a covering portion 6 for opening and closing the through hole. A finger tab 61 facilitates manual movement. The top of each leg 7 is provided with a projection 14, which is held in engaged positions by the slide mechanism of the lower half case 1 when the through hole 2 is completely exposed and when it is covered, respectively. Each leg 7 is provided with an oblique surface 13 by cutting the upper inner tip portion of the leg in the form of a triangular pyramid. The oblique surfaces 13 of the legs 7 extend convergently from the tips of the legs toward their bases. The oblique surfaces 13 are only provided on the portions of the legs 7 which are located near the boss of the lower half case when the legs are slid. The oblique surfaces 13 function as means for allowing the legs 7 to be slid without coming into contact with the material protrusion of the fuse-bonded portions of the top of the boss and an upper half case.

Figure 2:
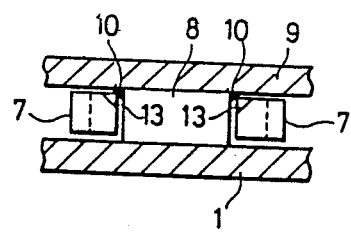
FIGS. 2, 4, 6 and 8 show partially-sectional views describing the relationship between the write-protect shutters and a boss.

FIG. 2 shows the relationship among the upper and the lower half cases 9 and 1, respectively, the boss 8 and the legs 7. Even though the material protrusion 10 is made out of the fuse-bonded portion of the boss 8, the legs 7 can be slid near the boss without coming into contact with the material protrusion, because the legs are provided with the oblique surface 13 facing the material protrusion.

Figure 3:
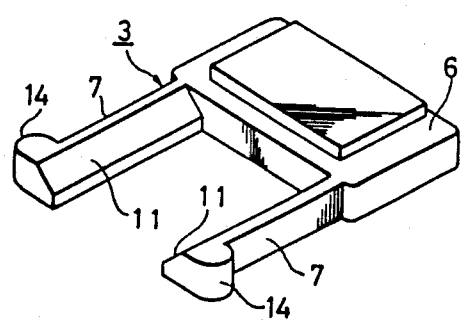

FIG. 3 shows a perspective view of a modification of the write-protect shutter 3, in which the legs 7 are provided with oblique surfaces 11 extending at the upper inner corners of the legs along the total length of each leg.

Figure 5:
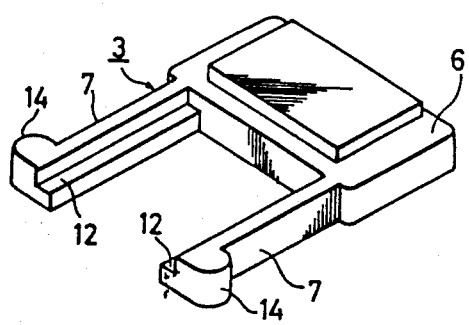

FIG. 5 shows a perspective view of another modification of the write-protect shutter 3, in which the legs 7 are provided with notches 12 extending at the upper inner corners of the legs 7 along the total length of each leg 7.

Figure 4:
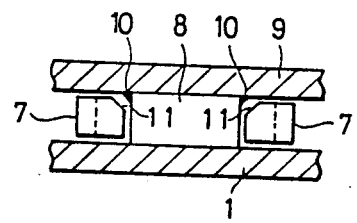
Figure 6:
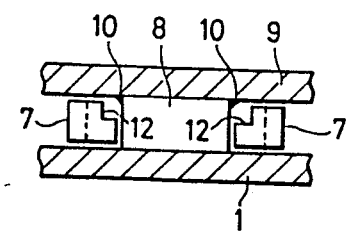
Figure 7:
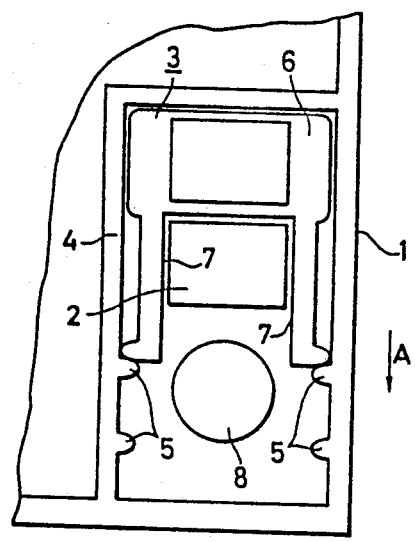
FIGS. 7 shows a schematic view of a conventional write-protect shutter.
Figure 8:
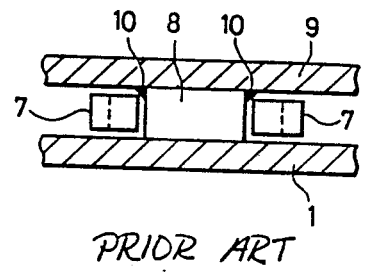

FIGS. 4 and 6 show the relationship among the upper and the lower half cases 9 and 1, respectively, the boss 8 and the legs 7, similarly to FIG. 2.

Since the oblique surfaces 11 and the notches 12 are provided along the total length of the legs 7 in the modifications, the legs do not come into contact with the material protrusion of the fuse-bonded portion of the boss 8 even if the boss is slightly displaced in the direction of the sliding of the mistaken erasure prevention member 3.

Although the oblique surfaces or the notches are provided at the upper inner corners of the legs in the above-described embodiment, the oblique surfaces or the notches may be provided at the lower inner corners of the legs if the boss extends down from the upper half case so that the fuse-bonded portion of the boss is located below the bottom of the upper half case.

The form of each of the contact prevention means for allowing the legs to be slid without coming into contact with the material protrusion of the fuse-bonded portion is not confined to those of the oblique surfaces and the notches adopted in the above-described embodiment, the contract prevention means may be of a different form which functions to allow the legs to be slid without coming into contact with the material protrusion.

According to the present invention, means for allowing the legs of a write-protect shutter to be slid without coming into contact with the material protrusion of the fuse-bonded portion of a boss are provided on the legs so that the mistaken erasure prevention member can be smoothly slid to surely open and close the through hole of a case despite the presence of the material protrusion.

Since the sliding of the write-protect shutter is not affected by the material protrusion, the accuracy of the fuse-bonding of the boss does not need to be high. For that reason, a magnetic disk cartridge can be easily and quickly assembled.

What is claimed:

1. A disk cartridge, comprising: a recording disk;
a case rotatably accommodating said disk and having aligned through holes in an upper and a lower principal wall, said case comprising a boss bonded to at least one of said upper and lower walls, wherein a bonding protrusion may be formed between said boss and said one wall at the junction thereof; and
a slidable member sliding between said walls to selectively cover said through holes, said slidable member including legs slidable on opposite sides of said boss, said legs being separated by a distance slightly larger than the diameter of said boss but less than the combined diameter of said boss and said bonding protrusion, said legs being shaped so that a portion thereof which slides adjacent the junction of said boss and said one wall is indented to provide a separation from one indentation to another slightly greater than the combined diameter of said boss and said bonding protrusion, wherein said member can slide without coming into contact with said bonding protrusion.

2. A disk cartridge as recited in claim 1, wherein said slidable member is a mistaken erasure prevention member.

3. A disk cartridge as recited in claim 2, wherein said legs contains position-fixing projections at free ends thereof.

4. A disk cartridge as recited in claim 1, wherein said boss is formed integrally with one of said walls and is fused with the other of said walls.

5. A disk cartridge as recited in claim 4, wherein each of said legs comprises a substantially flat surface facing said boss and wherein said indentation is formed in a side of said flat surface facing said other wall.

6. A disk cartridge as recited in claim 5, wherein said indentation comprises a triangular oblique surface with a side at a free end of said leg.

7. A disk cartridge as recited in claim 5, wherein said indentation comprises a uniform oblique surface extending along said leg.

8. A disk cartridge as recited in claim 5, wherein said indentation comprises a notch in a corner of said leg.

* * * * *